United States Patent [19]

Kaga et al.

[11] Patent Number: 5,292,693
[45] Date of Patent: Mar. 8, 1994

[54] SLURRY COMPOSITION AND SINTERED PART PREPARED THEREFROM

[75] Inventors: Takao Kaga; Yuzi Hoshi; Yutaka Kimura, all of Funabashi, Japan

[73] Assignee: Nissan Chemical Industries, Limited, Tokyo, Japan

[21] Appl. No.: 837,972

[22] Filed: Feb. 20, 1992

[30] Foreign Application Priority Data

Feb. 22, 1991 [JP] Japan .................. 3-028152

[51] Int. Cl.$^5$ .............................................. C04B 35/48
[52] U.S. Cl. .................... 501/103; 106/38.35
[58] Field of Search ....................... 501/103; 106/38.35

[56] References Cited

U.S. PATENT DOCUMENTS

| | | | |
|---|---|---|---|
| 4,328,294 | 5/1982 | Tanaka et al. | 501/103 |
| 4,923,830 | 5/1990 | Everhart et al. | 501/103 |
| 5,011,673 | 4/1991 | Kriechbaum et al. | 423/608 |

FOREIGN PATENT DOCUMENTS

| | | |
|---|---|---|
| 0166445 | 1/1986 | European Pat. Off. . |
| 0194556 | 9/1986 | European Pat. Off. . |
| 0314939 | 5/1989 | European Pat. Off. . |

OTHER PUBLICATIONS

Patent Abstracts of Japan, vol. 13, No. 556, JP-A-1 230 466 (1989).
Chemical Abstracts, vol. 110, No. 22, Abstract No. 198038Z (1988).

*Primary Examiner*—Mark L. Bell
*Assistant Examiner*—Deborah Jones
*Attorney, Agent, or Firm*—Birch, Stewart, Kolasch & Birch

[57] ABSTRACT

A sheet-forming slurry composition is composed of zirconia powder, an organic binder, and a solvent. The zirconia powder contains 2 to 10 mol % of yttria in solid solution form and has a BET specific surface area of up to about 12 m$^2$/g and a mean particle size multiplied by the specific surface area of up to 3 μm.m$^2$/g. The composition is formed into a green sheet having improved flexibility, binder removal capability, sinterability, and dimensional stability, which is then fired into a sintered part having improved denseness, gas barrier property, and surface smoothness.

15 Claims, No Drawings

SLURRY COMPOSITION AND SINTERED PART PREPARED THEREFROM

This invention relates to a slurry composition containing zirconia, and more particularly, to a zirconia base slurry composition which can be formed into green sheets having improved flexibility, binder removal capability, and sintering capability. It also relates to sheet-shaped sintered zirconia parts obtained from such a slurry composition and having improved compactness, gas barrier property and surface smoothness.

BACKGROUND OF THE INVENTION

One well-known prior art method for preparing sintered zirconia parts involves forming sheets by means of a doctor blade. According to this method, sintered zirconia parts are prepared by furnishing a slurry composition comprising zirconia powder, an organic binder, and a solvent, applying the slurry onto a carrier film to a predetermined thickness by means of a doctor blade, drying the coating by evaporating off the solvent, thereby solidifying the coating into a green sheet, working the green sheet into members of desired shape as by cutting or punching, and firing the members. It is critical for this method that green sheets possess sufficient flexibility and strength to withstand stresses applied during working steps such as cutting and punching and handling steps such as roll-up and raveling. It is also important that parts resulting from binder removal and firing of such green sheets are free of distortion, deflection or cracking and have a minimal shrinkage factor, a high density, and dimensional stability.

Several organic binders are known in the art to impart flexibility to ceramic molding compositions containing zirconia powder and be susceptible to burning off and sintering. Exemplary of such known binders are acrylic polymers, acrylic polymer emulsions, ethylene oxide polymers, hydroxyethyl cellulose, methyl cellulose, polyvinyl alcohol, isocyanates, wax lubricants, aqueous urethanes, methacrylate salts, wax emulsions, and ethylene-vinyl acetate copolymer emulsions.

Although sheet-forming compositions were prepared by adding these organic binders to zirconia powder along with solvents, it was very difficult to find a compromise among the above-mentioned requirements including flexibility, binder removal, sinterability, and dimensional stability. More particularly, if compositions were specially formulated to form green sheets having improved flexibility, binder removal and sinterability would be poor. If compositions were specially formulated to form green sheets having improved dimensional stability, the sheets suffered from flexibility. In addition, the optimum binder content largely varies with the type of zirconia powder.

In summary, sheet-forming slurry compositions should meet the requirements that green sheets formed therefrom are of uniform thickness and have appropriate flexibility and tensile strength, and that parts resulting from binder removal and firing of such green sheets are free of distortion, deflection or cracking and have a minimal shrinkage factor, a high density, and dimensional stability.

Although prior art sheet-forming slurry compositions were formulated so as to improve one or more factors among the flexibility, binder removal and sintering capabilities, and dimensional stability of green sheets as mentioned above, it was very difficult to find a good compromise among these factors insofar as conventional types of zirconia powder were used. Some factors were improved fully, but the remainders improved to only limited extents. No satisfactory sintered parts were obtained.

SUMMARY OF THE INVENTION

Therefore, a primary object of the present invention is to provide a sheet-forming slurry composition capable of forming green sheets having improved flexibility, binder removal and sintering capabilities, and dimensional stability.

Another object of the present invention is to provide a sintered zirconia part having improved compactness, gas barrier property and surface smoothness.

For achieving these and other objects, the present invention provides a sheet-forming slurry composition comprising zirconia powder, an organic binder, and a solvent. The zirconia powder contains 2 to 10 mol % of yttria in solid solution form and has a specific surface area of up to 12 $m^2/g$ as measured by BET method and a mean particle size multiplied by the specific surface area of up to 3 $\mu m \cdot m^2/g$.

A sintered zirconia part is prepared by forming a slurry composition as defined above into a sheet and firing the sheet.

DESCRIPTION OF THE PREFERRED EMBODIMENT

The sheet-forming slurry composition of the invention contains zirconia powder. In general, sintered parts of high density cannot be obtained from zirconia powder having a relatively large mean particle size because such coarse powder is less susceptible to sintering. Thus a smaller mean particle size is preferred, but a limit exists. A BET specific surface area of 12 $m^2/g$ should not be exceeded. Zirconia powder having a BET value of more than 12 $m^2/g$ needs an undesirably larger amount of binder so that the composition may undergo excess shrinkage deformation during firing. As zirconia particles go farther apart from spherical shape and as more particles agglomerate, together, entanglement of particles increases to make it difficult to increase zirconia concentration.

This suggests that zirconia powder best suited for sheet formation is obtained by determining a best balance among the specific surface area, mean particle size and geometrical shape of particles. We have found that such a balance is represented by a mean particle size multiplied by a BET specific surface area, which is simply referred to as "product", hereinafter. The zirconia powder best suited for sheet formation should have a specific surface area of up to 12 $m^2/g$ as measured by BET method and a product (mean particle size multiplied by specific surface area) of up to 3 $\mu m \cdot m^2/g$. The mean particle size used herein is measured by a centrifugal sedimentation method. Assume that zirconia particles have a true spherical shape, these particles have a product of 1 $\mu m \cdot m^2/g$. As the product approaches 1 $\mu m \cdot m^2/g$, zirconia particles become nearer in shape to true sphere and less agglomerate. Therefore, the product should be less than 3 $\mu m \cdot m^2/g$.

In more preferred embodiments, zirconia particles have a mean particle size of from 0.05 to 0.5 $\mu m$, especially from 0.1 to 0.4 $\mu m$ and a BET specific surface area of 3 to 12 $m^2/g$, especially from 5 to 10 $m^2/g$. More preferably, the product should range from 1 to 3 $\mu m \cdot m^2/g$, especially from 1 to 2.5 $\mu m \cdot m^2/g$.

The zirconia powder contains 2 to 10 mol %, preferably 2 to 8 mol % of yttria in solid solution form. Less than 2 mol % of solid solution-forming yttria invites problems like strength lowering and unstable thermal expansion whereas zirconia powder containing more than 10 mol % of yttria results in relatively weak sintered parts having low conductivity at high temperatures, which means a loss of performance as solid electrolytes.

Zirconia powder of the above-defined nature can be prepared by the methods described in Japanese Patent Publication No. 43286/1986 and Japanese Patent Application Kokai (JP-A) Nos. 97134/1986 and 185821/1988 and U.S. Pat. No. 4,873,064. For coloring sintered parts, metal salts commonly used for such purposes may be added to zirconia powder, if desired.

The organic binders used herein are ones commonly used in forming ceramic sheets, including acrylic polymers, acrylic polymer emulsions, ethylene oxide polymers, hydroxyethyl cellulose, methyl cellulose, polyvinyl alcohol, isocyanates, wax lubricants, aqueous urethanes, methacrylate salts, wax emulsions, and ethylenevinyl acetate copolymer emulsions.

The organic binder is preferably blended with the zirconia powder in such amounts that 16 to 30 parts by weight, more preferably 18 to 23 parts by weight, most preferably 19 to 22 parts by weight of binder calculated as solids is present per 100 parts by weight of zirconia powder. More than 30 parts of the binder would lead to an undesirably high linear shrinkage factor upon firing. Less than 16 parts of the binder would produce green sheets which have too low flexibility and strength to withstand cracking and are thus difficult to handle.

The zirconia powder may be blended with the organic binder to form a slurry by any desired conventional milling method, preferably by thoroughly milling in a ball mill for 2 to 5 days or longer. A more preferred method is by fully dispersing the zirconia powder in a solvent with the aid of a deflocculant, and then mixing the dispersion with the organic binder to form a sheet-forming slurry composition. The viscosity of the slurry composition may be adjusted if necessary. The preferred solvent is water. Examples of the useful deflocculant used herein include acrylic oligomers such as ammonium polyacrylate and ammonium acrylate-acrylate ester copolymers. The blending amount of the deflocculant is usually in the range of 1 part by weight or less, preferably 0.05 to 0.5 parts by weight per 100 parts by weight of the zirconia powder, although the amount should be a minimum permissible amount to ensure dispersion.

Additionally, a plasticizer may be added to a blend of the zirconia powder and the organic binder for improving the properties of green sheets obtained therefrom. Useful plasticizers include butyl benzyl phthalate, dioctyl phthalate, dinonyl phthalate, dibutyl phthalate, ethyl toluene sulfamide, glycerin, polyethylene glycol, polypropylene glycol, ethylene glycol, diethylene glycol, triethylene glycol, tri-N-butylphosphate, diethanol amine, triethanol amine, petriol, and polyols. The amount of the plasticizer may be in the range of less than 3 parts by weight per 100 parts by weight of the zirconia powder. If the slurry is foamable, a defoaming agent such as wax, silicone nonionic surfactants, and alcohols may be used.

The thus obtained slurry composition contains zirconia powder in a concentration of at least 55%, preferably 55 to 70%, more preferably 60 to 70% by weight just prior to coating for forming sheets.

The thus obtained sheet-forming slurry composition is deaerated in vacuum in a conventional manner and formed into a sheet, which is worked into pieces of desired shape by punching or cutting, and then subject to binder removal and firing.

Sheets are typically formed by a doctor blade method. The slurry composition is applied to a carrier web which is moved relative to a doctor blade at a speed of 0.01 to 1 m/min., the doctor blade being located at a spacing of 0.01 to 3 mm corresponding to the desired sheet thickness from the carrier film. At this point, the slurry should preferably have a viscosity of 3,000 to 20,000 centipoise, especially 10,000 to 15,000 centipoise because a slurry having a too low viscosity would fail to provide a constant flow quantity and hence, to form a green sheet of uniform thickness. The sheet is then dried typically by blowing hot air at a temperature of about 50° to 200° C. during or after sheet forming.

Then the sheet is worked into pieces of desired shape by cutting with a cutter or punching with a die.

Configured pieces are then pretreated for burning off the binder. Preferably they are heated from room temperature to about 500° C. at a rate of about 6° to 60° C./hour, thereby causing the binder to decompose and volatilize off.

Firing any directly follow the binder removal or be done later. The firing is generally at a temperature of about 1,300° to 1,600° C., preferably about 1,350° to 1,500° C. for about 0.2 to 10 hours, preferably about 1 to 4 hours although the firing temperature and time depend on the binder content. Conventional setters may be used for firing with setters of porous alumina being preferred. A green sheet may be interposed between setter segments if desired. The firing atmosphere may be air while an inert atmosphere of nitrogen, helium, argon or the like is acceptable.

In this way, a slurry composition according to the present invention is formed into a green sheet and then fired into a sintered zirconia part. The slurry composition and sintered part have the following benefits.

Since the slurry composition has a relatively low binder content, the shrinkage factor associated with firing of a green sheet into a sintered part is low enough to improve the dimensional stability of the end part. Since the slurry contains a relatively high concentration of zirconia particles, the shrinkage factor associated with drying of a green sheet is low so that the sheet receives less distortion from drying and eventually, the sintered part is substantially free of warpage, distortion and cracking. These benefits become more significant as the sheet surface area is increased or the sheet thickness is reduced.

The sintered part obtained by firing the composition after sheet formation and binder removal has a consolidated structure, an improved dimensional precision due to a low firing shrinkage factor, and a high sintered density approaching to the theoretical density, say, at least 98.5% of the theory. The part appears white and clear and has surface smoothness and excellent luster. The part has high mechanical strength due to its denseness. When used as electrolyte membranes in solid oxide fuel cells, the part provides theoretical performance with respect to electromotive force or the like due to its gas barrier property.

The plate-shape sintered parts will find a variety of applications as mechanical and electronic parts in machines and electronic equipment, functional parts in sensors and fuel cells by utilizing their solid electrolyte nature, and consumer goods such as razors.

EXAMPLE

Examples of the present invention are given below by way of illustration and not by way of limitation.

EXAMPLES 1 to 8 and Comparative Examples 1 to 5

A sheet-forming slurry composition was prepared from the following source materials, formed into a green sheet, and then fired into a sintered part according to the following procedures.

Source Materials

Zirconia Powders

It is to be noted that the mean particle size was measured by a centrifugal sedimentation method and the "product" is a mean particle size multiplied by a BET specific surface area.

(A1) Zirconia powder containing 3 mol % of $Y_2O_3$ and having a mean particle size of 0.2 μm, a BET specific surface area of 9 $m^2/g$, and a product of 1.8 μm·$m^2$/g (prepared by the method of JP-A 185821/1988).

(A2) Zirconia powder containing 3 mol % of $Y_2O_3$ and having a mean particle size of 0.33 μm, a BET specific surface area of 6.5 $m^2/g$, and a product of 2.15 μm·$m^2$/g (prepared by the method of JP-A 97134/1988).

(A3) Zirconia powder containing 8 mol % of $Y_2O_3$ and having a mean particle size of 0.22 μm, a BET specific surface area of 8.7 $m^2/g$, and a product of 1.91 μm·$m^2$/g (prepared by the method of JP-A 185821/1988).

(A4) Zirconia powder containing 3 mol % of $Y_2O_3$ and having a mean particle size of 0.24 μm, a BET specific surface area of 17.4 $m^2/g$, and a product of 4.18 μm·$m^2$/g.

(A5) Zirconia powder containing 3 mol % of $Y_2O_3$ and having a mean particle size of 0.63 μm, a BET specific surface area of 5.5 $m^2/g$, and a product of 3.5 μm·$m^2$/g.

| Deflocculant Ammonium polycarboxylate: | 40% by weight (solid matter) |
| Binder Water-soluble acrylic | 40% by weight (solid matter) |

| resin: | |
| Solvent Distilled water | |

Preparation of Sheet-Forming Slurry

Using 100 parts by weight of each zirconia powder (see Table 1), the deflocculant, and distilled water, a dispersion having a solid concentration of 80% by weight was prepared. To the dispersion was added the organic binder in the amount shown in Table 1. The mixture was milled in a ball mill charge with a milling medium of zirconia for 3 days. A defoaming agent was added in an amount of 0.03 parts by weight along with the organic binder and in an amount of 0.07 parts by weight at the end of milling. There was obtained a sheet-forming slurry composition, which was deaerated by means of a vacuum deaerator and adjusted in viscosity. The zirconia concentration I and slurry viscosity I before viscosity adjustment and the zirconia concentration II and slurry viscosity II after viscosity adjustment are shown in Table 1.

TABLE 1

| | Slurry composition | | | Slurry evaluation | | |
| --- | --- | --- | --- | --- | --- | --- |
| | $ZrO_2$ Powder | Binder (pbw) | Concentration I (wt %) | Concentration II (wt %) | Viscosity I (cps) | Viscosity II (cps) |
| Example 1 | A1 | 22 | 55.6 | 62.6 | 1800 | 10200 |
| Example 2 | A1 | 20 | 57.1 | 63.5 | 2000 | 15000 |
| Example 3 | A1 | 18 | 58.8 | 63.9 | 1900 | 10000 |
| Example 4 | A2 | 20 | 57.1 | 64.0 | 1000 | 14000 |
| Example 5 | A3 | 20 | 57.1 | 63.0 | 1500 | 14000 |
| Example 6 | A1 | 20 | 57.1 | 63.5 | 2000 | 15000 |
| Example 7 | A3 | 20 | 57.1 | 63.0 | 1500 | 14000 |
| Example 8 | A1 | 25 | 53.3 | 60.3 | 1200 | 10100 |
| Comparative Example 1 | A1 | 15 | 61.5 | 67.1 | 1800 | 15800 |
| Comparative Example 2 | A4 | 20 | 46.2 | 51.8 | 2000 | 18000 |
| Comparative Example 3 | A5 | 20 | 57.1 | 65.2 | 1000 | 8000 |
| Comparative Example 4 | A5 | 20 | 57.1 | 65.2 | 1000 | 8000 |

Formation of Green Sheet

The slurry was applied onto a carrier film by means of a conventional doctor blade applicator. The carrier web was fed at a speed of 10 m/hour. The spacing between the doctor blade and the carrier web was adjusted in accordance with the desired thickness of a finally sintered sheet as shown in Table 2. The coating was dried by heating with hot air to about 100° C. at a rate of 2° C./min., obtaining a greed sheet.

Sintering

The green sheet was cut into a piece of predetermined dimensions. It was rested on a setter and fired for 2 hours in an electric furnace at the temperature shown in Table 2, obtaining a sintered part.

The gas barrier property of the sintered part was evaluated by attaching electrodes to it and measuring an open circuit voltage while varying the oxygen partial pressure thereacross. The part was evaluated as having gas barrier property (yes) when a theoretical voltage was observed.

The evaluation results of the green sheet and sintered part are also shown in Table 2.

It will be understood that examples outside the numerical limit range of the present invention are also shown in Tables 1 and 2 as Comparative Examples 1 to 5.

TABLE 2

| | Green Sheet | | Firing | | Sintered part evaluation | | | |
|---|---|---|---|---|---|---|---|---|
| | Flexibility | Size (mm × mm) | Temp. (°C.) | Thickness (μm) | Linear shrinkage (%) | Crack or warpage | Gas barrier | Density |
| Example 1 | Good | 65 × 65 | 1450 | 200 | 23.1 | No | Yes | 6.05 |
| Example 2 | Good | 65 × 65 | 1450 | 200 | 22.3 | No | Yes | 6.07 |
| Example 3 | Good | 65 × 65 | 1450 | 200 | 21.1 | No | Yes | 6.07 |
| Example 4 | Good | 65 × 65 | 1450 | 200 | 22.2 | No | Yes | 6.06 |
| Example 5 | Good | 65 × 65 | 1450 | 200 | 22.0 | No | Yes | 5.99 |
| Example 6 | Good | 130 × 130 | 1450 | 100 | 22.3 | No | Yes | 6.06 |
| Example 7 | Good | 130 × 130 | 1450 | 100 | 22.1 | No | Yes | 5.98 |
| Example 8 | Good | 65 × 65 | 1550 | 200 | 25.5 | No | Yes | 6.04 |
| Comparative Example 1 | Good | 65 × 65 | 1450 | 200 | 24.8 | No | No | 5.90 |
| Comparative Example 2 | Poor | 65 × 65 | green sheet could not be handled (cracked) | | | | | |
| Comparative Example 3 | Good | 65 × 65 | 1450 | 200 | 23.2 | Occurred | No | 5.98 |
| Comparative Example 4 | Good | 65 × 65 | 1450 | 200 | 21.0 | No | No | 5.85 |
| Comparative Example 5 | Good | 65 × 65 | 1550 | 200 | 21.5 | No | No | 5.92 |

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

We claim:

1. A sheet-forming slurry composition comprising zirconia powder, an organic binder, and a solvent,
   the zirconia powder containing 2 to 10 mol % of yttria in solid solution form and having a specific surface area of 5-10 m²/g as measured by BET method and a mean particle size multiplied by the specific surface area of up to 3 μm.m²/g;
   wherein the organic binder is present in an amount of 16–30 parts by weight per 100 parts of zirconia powder.

2. The slurry composition of claim 1 wherein the zirconia powder has a mean particle size multiplied by specific surface area of 1 to 3 μm.m²/g.

3. The slurry composition of claim 1 wherein the zirconia powder has a mean particle size of 0.05 to 0.5 μm.

4. The slurry composition of claim 1 wherein the solvent is present in such an amount to provide the composition with a viscosity of 3,000 to 20,000 centipoise.

5. The slurry composition according to claim 3, wherein the zirconia powder has a mean particle size of 0.1 to 0.4 μm.

6. The slurry composition according to claim 2, wherein the zirconia powder has a mean particle size multiplied by specific surface area of 1 to 2.5 μm.m²/g.

7. A sheet-forming slurry composition according to claim 1, wherein the zirconia powder contains 2 to 8 mol % of yttria.

8. The sheet-forming slurry composition according to claim 1, wherein the organic binder is selected from the group consisting of acrylic polymers, acrylic polymer emulsions, ethylene oxide polymers, hydroxyethyl cellulose, methyl cellulose, polyvinyl alcohol, isocyanates, wax lubricants, aqueous urethanes, methacrylate salts, wax emulsions, and ethylenevinyl acetate copolymer emulsions.

9. The slurry composition according to claim 1, wherein 18 to 23 parts by weight of the organic binder is present.

10. The slurry composition according to claim 9, wherein 19 to 22 parts by weight of the organic binder is present.

11. A sheet-forming slurry composition according to claim 1, wherein the solvent is water.

12. A sheet-forming slurry composition according to claim 1, further comprising a deflocculent selected from the group consisting of an ammonium polyacrylate and ammonium acrylate-acrylate ester copolymer, in an amount of one part by weight or less.

13. A slurry composition according to claim 1, further comprising a plasticizer selected from the group consisting of butyl benzyl phthalate, dioctyl phthalate, dinonyl phthalate, dibutyl phthalate, ethyl toluene sulfamide, glycerin, polyethylene glycol, polypropylene glycol, ethylene glucol, diethylene glycol, triethylene glycol, tri-N-butylphosphate, diethanol amine, triethanol amine, petroil, and polyols, in an amount of less than three parts by weight of plasticizers per 100 parts by weight of the zirconia powder.

14. The slurry composition according to claim 4, wherein the viscosity of the composition is 10,000 to 15,000 cps.

15. A sheet-shaped sintered zirconia part prepared by forming a slurry composition as set forth in any one of claims 1, 2, 3, or 4 into a green sheet and firing the green sheet.

* * * * *